United States Patent
Machii et al.

[11] Patent Number: 6,025,056
[45] Date of Patent: Feb. 15, 2000

[54] LAMINATE SHEET AND PROCESS FOR MAKING A SEAMLESS CAN USING THE SAME

[75] Inventors: Sachiko Machii; Yoshiki Takesue; Kazuhiro Sato; Tetsuo Miyazawa; Katsuhiro Imazu; Toshio Sue, all of Kanagawa, Japan

[73] Assignee: Toyo Seikan Kaisha, Ltd., Tokyo, Japan

[21] Appl. No.: 08/848,656

[22] Filed: Apr. 29, 1997

[30] Foreign Application Priority Data

May 1, 1996 [JP] Japan ................................. 8-110868

[51] Int. Cl.[7] .............................. B32B 3/00; B32B 15/08; B32B 9/00

[52] U.S. Cl. ....................... 428/204; 428/207; 428/458; 428/472

[58] Field of Search .................... 428/458, 472, 428/323, 204, 207; 220/906, 67.22

[56] References Cited

U.S. PATENT DOCUMENTS 5,498,454  3/1996  Kuze et al. .......................... 428/35.9

FOREIGN PATENT DOCUMENTS 0550011  7/1993  European Pat. Off. .
2055687  3/1981  United Kingdom .

*Primary Examiner*—Paul Thibodeau
*Assistant Examiner*—Holly C Rickman
*Attorney, Agent, or Firm*—Sughrue, Mion, Zinn, Macpeak & Seas, PLLC

[57] ABSTRACT

A laminate for can-making is disclosed, comprising a metal sheet and a thermoplastic resin layer provided on the surface of the metal sheet. The thermoplastic resin layer comprises a laminate film layer comprising a polyester-base resin intermediate layer (A) containing 10 wt % or more of coloring agent particles, a polyester-base resin outer surface layer (B) and a polyester-base resin backing layer (C). The outer surface layer (B) and the backing layer (C) each contains the coloring agent particles in an amount of 20 wt % or less and at the same time, in an amount less than that contained in the intermediate layer (A). Also disclosed is a process for making a can using the laminate.

8 Claims, 4 Drawing Sheets

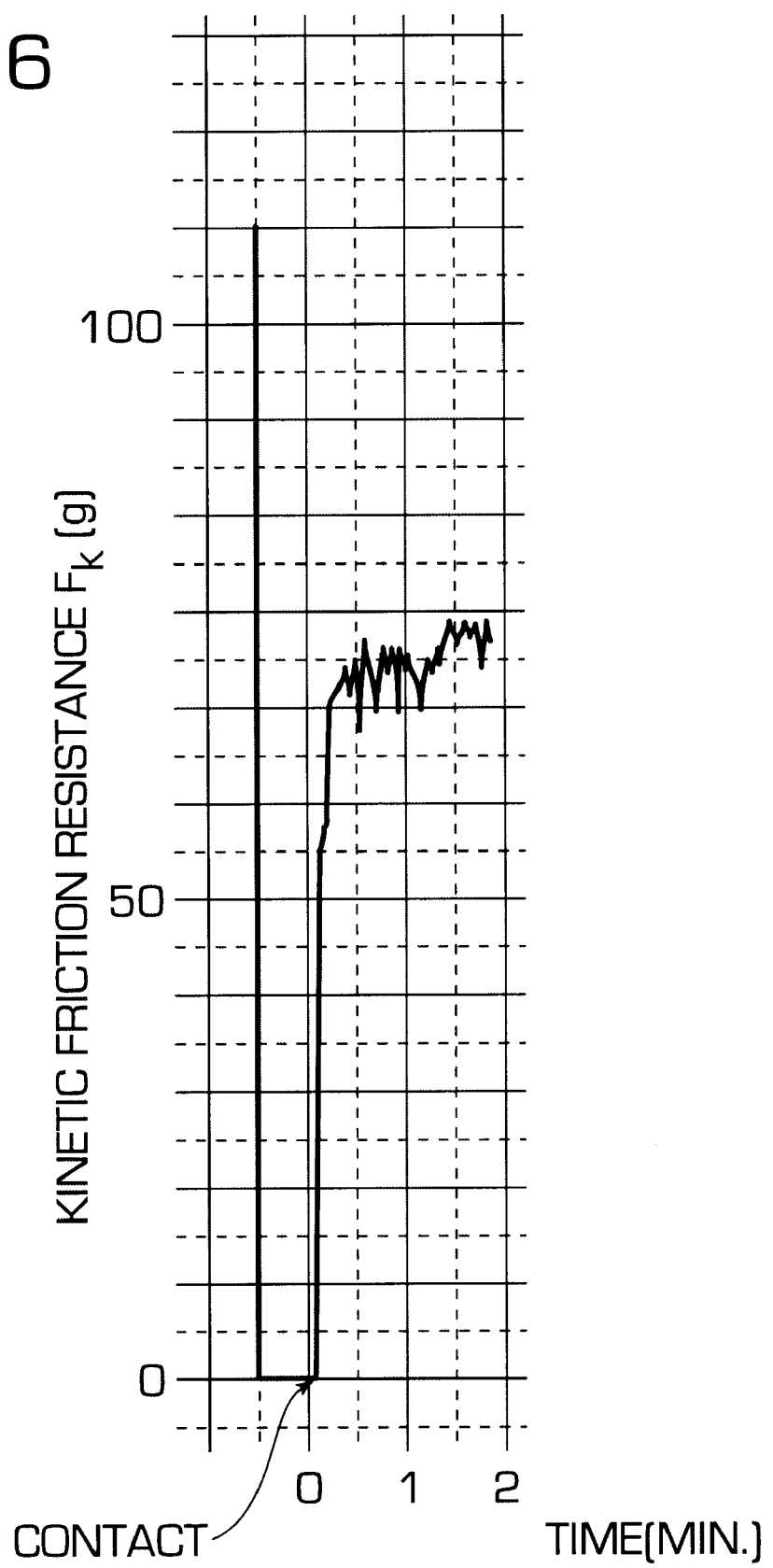

LAMINATE SHEET AND PROCESS FOR MAKING A SEAMLESS CAN USING THE SAME

FIELD OF THE INVENTION

The present invention relates to a laminate sheet for canning having a laminate film layer and a process for making a seamless can using the laminate sheet. More specifically, the present invention relates to a laminate sheet for canning, which not only reduces working tool abrasion but also shaving of the film layer, and further provides a coated seamless can having an excellent outer face hiding property, and to a process for making a seamless can using the laminate sheet.

BACKGROUND OF THE INVENTION

A side seamless can be produced, according to a conventional method, by subjecting a metal blank such as an aluminum plate, a tin plate or a tin-free steel plate to at least one drawing stage. The drawing stage is conducted between a drawing die and a punch to form a cup comprising a barrel portion free of seams on the side surface thereof and a bottom portion integrally connected to the barrel portion which is also free of seams. Then, if desired, the barrel portion may be subjected to ironing between an ironing punch and a die to reduce the thickness of the barrel portion of the container. It is also known in the art to reduce the thickness of the side wall by bending and elongating the side wall at a curvature corner part of the redrawing die as described, for example, in JP-B-56-501442 (the term "JP-B" as used herein means an "examined Japanese patent publication").

Methods for coating an organic film onto the side seamless can include a method of applying an organic paint onto a formed can which is a common and widely used technique and, in addition, a method of laminating a resin film onto a metal blank before a can is formed. Furthermore, JP-B-59-34580 describes a product obtained by laminating a polyester film derived from terephthalic acid and tetramethylene glycol onto a metal blank. Also, in the production of a can redrawn by bend-elongation, the use of a metal sheet coated with a vinyl organosol, epoxy, phenolic, polyester or acryl resin is known.

Furthermore, it is known to produce a colored seamless can having an outer face that is coated with a resin film havin previously incorporated therein a coloring agent. JP-B-U-6-16739 (the term "JP-B-U" as used herein means an "examined Japanese utility model publication") and JP-B-U-6-16740 describe a seamless can comprising a laminate of a clear polyester-base molecular orientated film layer/ adhesive/surface treated steel plate/adhesive/titanium dioxide-containing polyester-base molecular orientated film/printed ink layer/finishing varnish layer in this order from the inner side to the outer side of the can. Also disclosed is a seamless can comprising a laminate of clear polyester-base molecular orientated film layer/adhesive/ surface treated aluminum alloy plate/adhesive/titanium dioxide-containing polyester-base molecular orientated film/printed ink layer/finishing varnish layer, respectively.

JP-A-6-39980 (the term "JP-A" as used herein means an "unexamined published Japanese patent application") describes a polyester film for use in laminating and forming metal sheets, obtained by laminating a specific copolymer polyester layer containing 1 wt % or less of a lubricant having an average particle size of 2.5 μm or less and a specific copolymer polyester layer containing from 5 to 30 wt % of a filler having an average particle size of 2.5 μm or less.

JP-A-8-3334 describes a metal sheet laminated white polyester film having a Young's modulus of from 50 to 350 kg/mm$^2$, obtained by laminating a layer comprising polyester (III) mainly consisting of ethylene terephthalate having a melting point of from 150 to 230° C. on a layer which comprises a mixture of polyester (I) containing 20 mol % or more of a cyclohexylenedimethylene terephthalate unit and polyester (II) mainly consisting of ethylene terephthalate in a weight ratio of from 100:0 to 10:90 and containing from 15 to 50 wt % of a coloring agent.

The titanium dioxide-containing polyester-base molecularly orientated film layer arranged on the outer face of a seamless can is advantageous in that it covers the chromium surface treated layer to accentuate the printed ink layer, provides good transmission of a blank holder force on drawing-redrawing to prevent generation of wrinkles on the can barrel, and helps to prevent rusting. However, the following problems still need to be overcome.

In order to enhance the hiding power of the coloring agent particle-containing resin outer layer, the content of the coloring agent particles such as titanium dioxide must be increased. However, if the coloring agent particle content is increased, a problem arises in that the outer layer resin film is shaved, or the forming tools are abraded on drawing formation or ironing formation. This tendency becomes more pronounced as the can barrel portion is thinned to a greater extent so as to save materials or lighten the weight.

In general, the ironing ring is made from a carbide material such as tungsten carbide, and even the carbide material may form a break on the order of several microns after forming a large number of cans. If a tool bears such a break, the seamless can may have a bottom recession, the formed can may not be smoothly stripped from the punch, or the barrel may be broken.

In the process of making a can using a resin laminate sheet, the can is generally filled with contents without rinsing the can barrel after formation. If the film is shaved as described above, the metal can not only has an impaired appearance, but also the film dust may disadvantageously mix with the can contents.

SUMMARY OF THE INVENTION

It is therefore an object of the present invention to provide a laminate for can-making, which can reduce the abrasion of working tools and particularly an ironing ring, prevent shaving of the film layer and ensure efficient production of a coated seamless can having an excellent covering property, adhesion property and corrosion resistance.

Another object of the present invention is to provide a process for making a can using the above described laminate sheet.

The above objects have been achieved in accordance with the present invention by providing a laminate for can-making, comprising a metal sheet and a thermoplastic resin layer provided on the surface of the metal sheet, wherein the thermoplastic resin layer comprises a laminate film layer comprising a polyester-base resin intermediate layer (A) containing coloring agent particles in an amount of 10 wt % or more, a polyester-base resin outer surface layer (B) and a polyester-base resin backing layer (C), the outer surface layer (B) and the backing layer (C) each containing coloring agent particles in an amount of 20 wt % or less and in an amount less than that contained in the intermediate layer (A).

Furthermore, the present invention provides a process for making a seamless can comprising a barrel portion having an outer face and an inner face and a can bottom portion, which comprises providing a laminate comprising a metal sheet and a thermoplastic resin layer provided on the surface of the metal sheet, the thermoplastic resin layer comprising a laminate film layer comprising a polyester-base resin intermediate layer (A) containing coloring agent particles in an amount of 10 wt % or more, a polyester-base resin outer surface layer (B) and a polyester-base resin backing layer (C), the outer surface layer (B) and the backing layer (C) each containing coloring agent particles in an amount of 20 wt % or less and in an amount less than that contained in the intermediate layer (A), and subjecting the laminate to draw-ironing formation between a punch and a die such that the laminate film is arranged on at least the outer face of the can.

In preferred embodiments of the laminate for can-making according to the present invention:

1. The intermediate layer (A) contains coloring agent particles in an amount of from 10 to 70 wt %, more preferably from 15 to 70 wt %, and the outer surface layer (B) and the backing layer (C) each contains coloring agent particles in an amount of from 0 to 18 wt %, more preferably from 0 to 15 wt %, and in an amount less than that contained in the intermediate layer (A);
2. The coloring agent particle comprises titanium dioxide;
3. The thickness ratio of the intermediate layer (A) to the outer surface layer (B) or the backing layer (C) is from 2:1 to 100:1, more preferably from 5:1 to 100:1;
4. The laminate film has a thickness of from 2 to 50 μm, more preferably from 5 to 50 μm;
5. The polyester-base resin is a polyester mainly comprising at least one ester unit selected from the group consisting of ethylene terephthalate, ethylene isophthalate, butylene terephthalate, butylene isophthalate and ethylene naphthalate; and
6. The polyester-base resin of the outer surface layer (B) has a melting point of from 180 to 270° C., more preferably from 200 to 270° C.

In preferred embodiments of the process for making a can according to the present invention:

7. The draw-ironing comprises reducing the thickness of the can barrel to a thickness of from 10 to 70%, more preferably from 10 to 65%, of the laminate sheet;
8. The draw-ironing comprises ironing at an ironing ratio of from 2 to 60%, more preferably from 5 to 50%; and
9. The draw-ironing comprises maintaining the laminate sheet at a temperature of from room temperature to 265° C., and more preferably at a temperature at least 5° C. lower than the melting point of the polyester-base resin in the outer surface layer.

BRIEF DESCRIPTION OF THE DRAWINGS

FIG. 6 is a view showing a measurement example of the kinetic friction resistance in a model kinetic friction test.

DETAILED DESCRIPTION OF THE INVENTION

Figure 1:
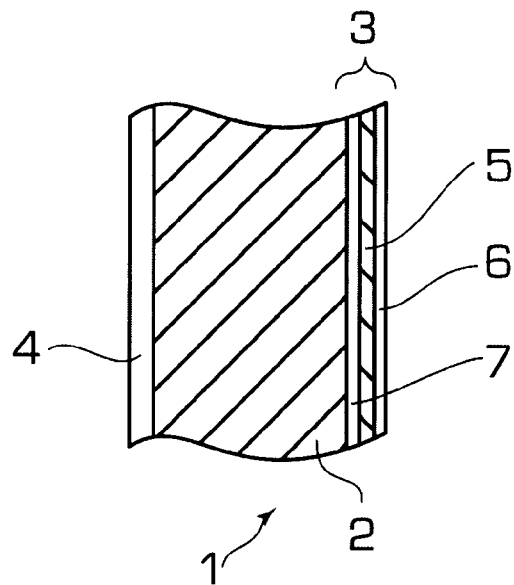
FIG. 1 is a view showing one example of the cross-sectional structure of the laminate sheet of the present invention for can-making.

FIG. 1 shows one example of a cross-section structure of the laminate for can-making according to the present invention. The laminate sheet 1 comprises a metal substrate 2 and a laminate resin layer 3 adhering to the surface of the metal substrate, which is arranged on the outer face of a container. Another resin layer 4 is adhered and provided on the surface of the metal substrate, which constitutes the inner surface of a container. The laminate resin layer 3 comprises an intermediate layer (A) 5, an outer surface layer (B) 6 and a backing layer (C) 7.

The above-described film layer may also be provided on the side of the metal substrate to be arranged on the inner surface of a container.

Figure 2:
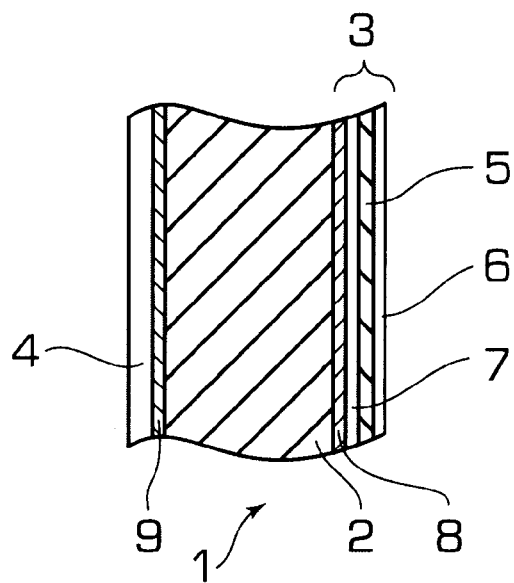
FIG. 2 is a view showing another example of the cross-sectional structure of the laminate sheet of the present invention for can-making.

FIG. 2 shows another example of a cross-section structure of the laminate for can-making according to the present invention. The metal substrate 2, the laminate resin layer 3 and the other resin layer 4 constituting the laminate sheet 1 are the same as in the case of FIG. 1. The laminate resin layer 3 and the other resin layer 4 are adhered to the metal substrate through an adhesion primer layer 8 and an adhesion primer layer 9, respectively.

In the present invention, the intermediate layer (A) 5 comprises a polyester-base resin containing coloring agent particles in an amount of 10 wt % or more. The outer surface layer (B) 6 and the backing layer (C) 7 each comprises a polyester-resin containing coloring agent particles in an amount of 20 wt % or less and at the same time, in an amount (including 0) less than that contained in the intermediate layer (A).

As described above, in order to enhance the metal sheet hiding power of the resin outer face, it is necessary to increase the content of coloring agent particles in the resin. In the present invention, the polyester-base resin coating layer to be arranged on the outer face of a can is a laminate film layer comprising an intermediate layer (A), a outer surface layer (B) and a backing layer (C). The intermediate layer (A) contains coloring agent particles in a large amount of 10 wt % or more to thereby enhance its hiding power, whereas the outer surface layer (B) contains coloring agent particles in a small amount of 20 wt % or less and at the same time, in an amount less than that contained in the intermediate layer (A). As a result, tool abrasion and also shaving or abrasion of the film are prevented on drawing and ironing.

Furthermore, the backing layer (C) contains a coloring agent in an amount less than that contained in the intermediate layer (A). As a result, adhesion to the metal substrate, workability of the laminate and corrosion resistance of the formed can are improved.

Figure 3:
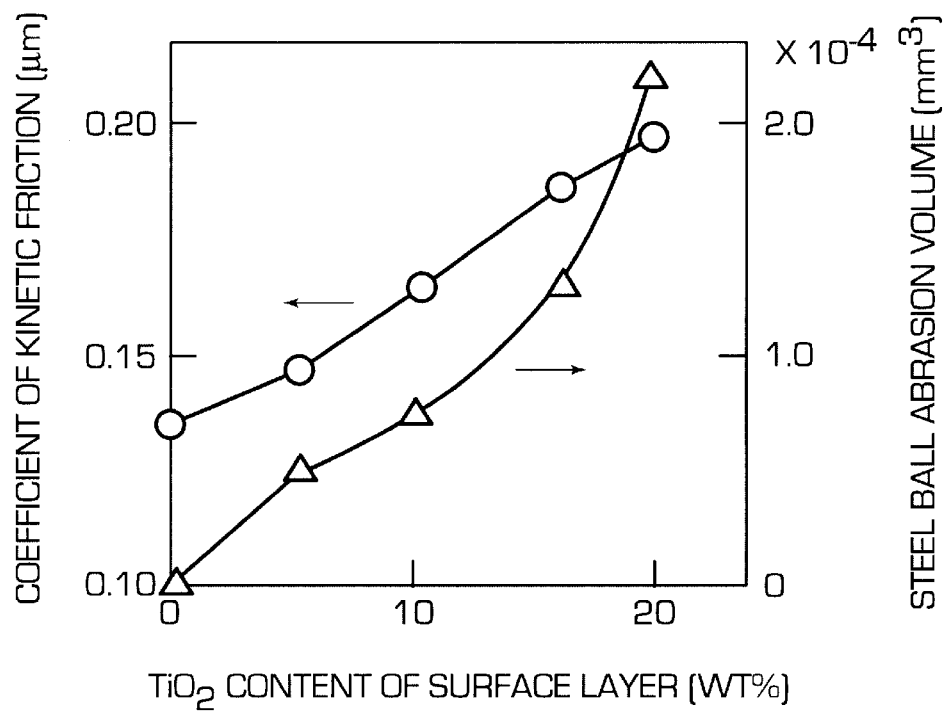
FIG. 3 is a view showing the relationship of the titanium dioxide content of the outer surface layer as a function of the coefficient of kinetic friction and the steel ball abrasion volume.

FIG. 3 shows the results of a model kinetic friction test (which is described in detail below) on resin-coated metal sheets, more specifically, the relationship between the titanium dioxide content of the outer surface layer and the coefficient of kinetic friction or the steel ball abrasion volume of the coated surface.

According to the test results, as the titanium dioxide content increases, the coefficient of kinetic friction and the steel ball abrasion volume both increase. However, the steel ball abrasion volume abruptly increases in the vicinity of a titanium dioxide content exceeding 20 wt %. On viewing the surface state of the outer surface layer through a microscope, as the titanium dioxide content increases, the film is shaved to a larger extent. This is one of the reasons why the coloring agent particle content of the outer surface layer (B) is set to 20 wt % or less.

The following is in reference to Example 7 which is described below. When a laminate sheet obtained by laminating a film comprising a sole polyester layer containing a constant amount of titanium dioxide (content: 25 wt %) is subjected to draw-ironing formation, bottom recession or stripping failure occurs after can formation, and in practice, flaws are generated on the ironing ring. On the other hand, when a laminate sheet obtained by coating a laminate film consisting of an intermediate layer, an outer surface layer and a backing layer, where the intermediate layer contains the same amount of titanium dioxide as above, and the outer surface layer and the backing layer each contains titanium dioxide in an amount less than that contained in the intermediate layer is subjected to draw-ironing formation, the formation failure as described above does not occur and the ironing ring is completely free of flaws (Example 3).

Furthermore, as verified in Example 12, when a laminate sheet having a two-layer structure of a lower layer and an upper layer, where the lower layer contains a large amount of titanium dioxide (content: 35 wt %) and the upper layer contains titanium dioxide in a small amount is subjected to draw-ironing formation, and when the filled can is subjected to a denting test, the film layer is peeled off and under-film corrosion (UFC) is generated during storage. On the other hand, the laminate sheet using the above-described three-layer film is completely free either of peeling or the generation of UFC. This is considered to occur because the backing layer (C) having a small coloring agent content exhibits excellent adhesion to the metal substrate and also acts as a cushioning layer.

In the present invention, by incorporating a coloring agent into the intermediate layer (A) in a large amount, and by incorporating a coloring agent into the outer surface layer (B) and the backing layer (C) in a small amount, many advantages are achieved in terms of formation of a laminate film, lamination to a metal sheet and drawing/ironing workability. More specifically, this multi-layer film has a symmetric or nearly symmetric constitution and therefore, the film can be easily formed, laminated on a metal without causing any distortion, and laminated and adhered with a good working property. Furthermore, because the film is laminated with little distortion and the outer surface layer (B) and the backing layer (C) prevent an excessive increase in working force, the ironing formability can be improved and the can making rate can be increased.

Metal Sheet:

In the present invention, various surface-treated steel plates and light metal sheets such as aluminum can be used as the metal sheet.

The surface-treated steel plate for use in the present invention includes those obtained by annealing a cold-rolled steel plate, subjecting it to secondary cold rolling, and applying thereon one or more surface treatments such as zinc plating, tin plating, nickel plating, treatment with an electrolytic chromic acid and treatment with chromic acid. A preferred example of the surface-treated steel plate is a steel plate treated with electrolytic chromic acid, and more preferred is a steel plate having a treated surface which comprises from 10 to 200 mg/m$^2$ of a metal chromium layer and from 1 to 50 mg/m$^2$ (in terms of metal chromium) of a chromium oxide layer. This steel plate has excellent coating adhesion and corrosion resistance in combination. Another example of the surface-treated steel plate is a hard tin plate having a tin plating amount of from 0.5 to 11.2 g/m$^2$. This tin plate is preferably treated with chromic acid or treated with chromic acid-phosphoric acid to provide a chromium amount in terms of metal chromium of from 1 to 30 mg/m$^2$.

Still another example is an aluminum-coated steel plate subjected to aluminum plating or aluminum press-adhesion.

The light metal sheet includes an aluminum plate and an aluminum alloy plate. The aluminum alloy plate having excellent corrosion resistance and workability has a composition such that Mn is from 0.2 to 1.5 wt %, Mg is from 0.8 to 5 wt %, Zn is from 0.25 to 0.3 wt % and Cu is from 0.15 to 0.25 wt % with the balance being Al. The light metal sheet is also preferably treated with chromic acid or treated with chromic acid/phosphoric acid to provide a chromium amount in terms of metal chromium of from 20 to 300 mg/m$^2$.

The blank thickness of the metal sheet, namely, the thickness (tB) of the can bottom portion, varies depending upon the kind of the metal or the use or size of the container. However, the thickness (tB) in general is preferably from 0.10 to 0.50 mm and more preferably, in the case of a surface-treated steel plate, from 0.10 to 0.30 mm and in the case of a light metal sheet, from 0.15 to 0.40 mm.

Polyester-Base Laminate Film:

The laminate film for use in the present invention comprises at least three layers of an intermediate layer (A), an outer surface layer (B) and a backing layer (C), and may have any construction as long as the intermediate layer (A) contains 10 wt % or more of a coloring agent, the outer surface layer (B) and the backing layer (C) each contains 20 wt % or less of a coloring agent, and the amount of the coloring agent contained in the outer surface layer and in the backing layer each is less than that contained in the intermediate layer.

Suitable examples of the coloring agent (pigment) include the followings.

Black pigment:
  carbon black, acetylene black, lamp black and aniline black;

Yellow pigment:
  chrome yellow, zinc yellow, cadmium yellow, yellow iron oxide, Mineral Fast Yellow, nickel titanium yellow, naples yellow, Naphthol Yellow S, Hansa Yellow G, Hansa Yellow 10G, Benzidine Yellow G, Benzidine yellow GR, Quinoline Yellow Lake, Permanent Yellow NCG and Tartrazine Lake;

Orange pigment:
  chrome orange, molybdenum orange, Permanent Orange GTR, Pyrazolone Orange, Vulcan Orange, Indanthrene Brilliant Orange RK, Benzidine Orange G and Indanthrene Brilliant Orange GK;

Red pigment:
  red iron oxide, cadmium red, red lead, potassium cadmium sulfide, Permanent Red 4R, Lithol Red, Pyrazolone Red, Watchung Red Calcium Salt, Lake Red D, Brilliant Carmine 6B, eosine lake, Rhodamine Lake B, alizarin lake and Brilliant Carmine 3B;

Violet pigment:
  manganese violet, Fast Violet B and Methyl Violet Lake;

Blue pigment:
  prussian blue, cobalt blue, Alkali Blue Lake, Phthalocyanine Blue, nonmetallic Phthalocyanine Blue, Phthalocyanine Blue partial chlorinated product, Fast Sky blue and Indanthrene Blue BC;

Green pigment:
  Chrome Green, chromium oxide, Pigment Green B, Malachite Green Lake and Final Yellow Green G;
White pigment:
  zinc flower, titanium oxide, antimony white and zinc sulfide; and
Extender pigment:
  barite powder, barium carbonate, clay, white carbon, talc and alumina white.

In general, the particle size of the coloring agent is preferably from 0.1 to 2.5 μm, more preferably from 0.1 to 2.0 μm. If the particle size is too large, the draw-ironing workability tends to worsen, whereas if the particle size is too small, the hiding power tends to decrease.

The coloring agent particularly preferred for achieving the objectives of the present invention is titanium dioxide, preferably rutile-type or anatase-type titanium dioxide. These are white and have a large hiding power.

The polyester-base resin is preferably polyester mainly comprising at least one ester unit selected from the group consisting of ethylene terephthalate, ethylene isophthalate, butylene terephthalate, butylene isophthalate and ethylene naphthalate, in view of draw-ironing workability, mechanical strength, corrosion resistance and heat durability. This polyester may be a homopolyester, a copolyester comprising at least one of the above-described ester units and at least one other ester unit, or a polyester blend of two or more of these polyesters.

The laminate films constituting an intermediate layer (A), an outer surface layer (B) and a backing layer (C) may be common with or different from each other. For example, the polyester constituting the intermediate layer (A) may be a polyester having a relatively low melting point so as to facilitate dispersion of the coloring agent, and the polyester constituting the outer surface layer (B) may be a polyester having a relatively high melting point to impart heat durability. Furthermore, the polyester constituting the backing layer (C) may be a heat-adhesive polyester having a relatively low melting point.

The polyester-base resin for the outer surface layer (B) preferably has a melting point of from 180 to 270° C., more preferably from 200 to 270° C., in view of heat durability of the container and the mechanical property and workability of the film layer.

The polyester-base resin for use in the present invention is preferably a homopolyester or copolyester derived from a dibasic acid mainly comprising a terephthalic acid and a diol mainly comprising ethylene glycol.

Examples of the dibasic acid include, in addition to terephthalic acid, isophthalic acid, P-β-oxyethoxybenzoic acid, naphthalene-2,6-dicarboxylic acid, diphenoxyethane-4,4'-dicarboxylic acid, 5-sodium sulfoisophthalic acid, hexahydroterephthalic acid, adipic acid and sebacic acid.

Examples of the diol component include, in addition to ethylene glycol, glycol components such as propylene glycol, 1,4-butanediol, neopentyl glycol, 1,6-hexylene glycol, diethylene glycol, triethylene glycol, cyclohexanedimethanol and an ethylene oxide adduct of bisphenol A.

The above-described homopolyester or copolyester must have a molecular weight in a range which allows for film formation and preferably has an intrinsic viscosity (η) measured using a phenol/tetrachloroethane mixed solvent of from 0.5 to 1.5, preferably from 0.6 to 1.5.

In a preferred embodiment of the present invention, the intermediate layer (A) has a coloring agent particle content of from 10 to 70 wt %, more preferably from 15 to 70 wt %, the outer surface layer (B) and the backing layer (C) each has a coloring agent particle content of from 0 to 18 wt %, more preferably from 0 to 15 wt %, and at the same time, the outer surface layer (B) and the backing layer (C) have a coloring agent content that is less than that of the intermediate layer (A). If the coloring agent content of the intermediate layer (A) is lower than the above-described range, the advantage of the present invention such that the draw-ironing formability is improved while maintaining high hiding power may be lost, whereas if it is higher than the above-described range, problems such as breaking of the film layer may readily occur during draw-ironing formation. Furthermore, if the coloring agent concentration in the outer surface layer (B) or the backing layer (C) is higher than the above-described range, tool abrasion may increase or adhesion to the metal may be reduced.

The thickness ratio of the intermediate layer (A) to the outer surface layer (B) or the backing layer (C) is preferably from 2:1 to 100:1, more preferably from 5:1 to 100:1. If the thickness ratio of the intermediate layer (A) is smaller than the above-described range, the hiding power tends to be considerably deficient, whereas if the thickness ratio of the outer surface layer (B) or the backing layer (C) is smaller than the above-described range, tool abrasion tends to increase and adhesion to the metal tends to decrease.

The thickness of the laminate film as a whole is preferably from 2 to 50 μm, more preferably from 5 to 50 μm. If the thickness is less than the above-described range, the corrosion resistance is not satisfactory, whereas if it exceeds the above-described range, the draw-ironing property tends to decrease.

Generally, the polyester-base laminate film is preferably biaxially stretched, but an unstretched film may also be used. The degree of biaxial orientation may be verified by an X-ray diffraction method, a polarized fluorometric method, a birefringence method or a density gradient piping method. The degree of biaxial stretching of the film is preferably such that the degree of crystallization by the density method is approximately from 10 to 50%.

Known compounding agents for films, various antistatic agents and lubricants may be added to the polyester-base laminate film according to a known formulation.

Although not generally needed, in case of using a primer for adhesion, in order to increase adhesion of the primer for adhesion to the film, the surface of the biaxially stretched polyester laminate film in general is preferably subjected to a corona discharge treatment. The corona discharge treatment is preferably carried out to the extent that the wet tension is 44 dyne/cm or more. In addition, the film may be subjected to known surface treatments for improving adhesion such as plasma treatment or flame treatment, or to a coating treatment for improving adhesion with a urethane resin or a modified polyester resin.

The other resin layer provided on the can inner surface side may contain a coloring agent, if desired, however, the same polyester-base film as above can be used. This film may either be a single layer film or a laminate film.

Method of Producing Laminate:

The polyester-metal laminate sheet for use in the present invention may be produced by heat bonding a polyester-base laminate film to a metal through the backing layer (C). Another method may also be used, where a polyester having the above-described laminate structure is melt-extruded through a multilayer multiple die and the extruded product is coated on a metal substrate.

Figure 4:
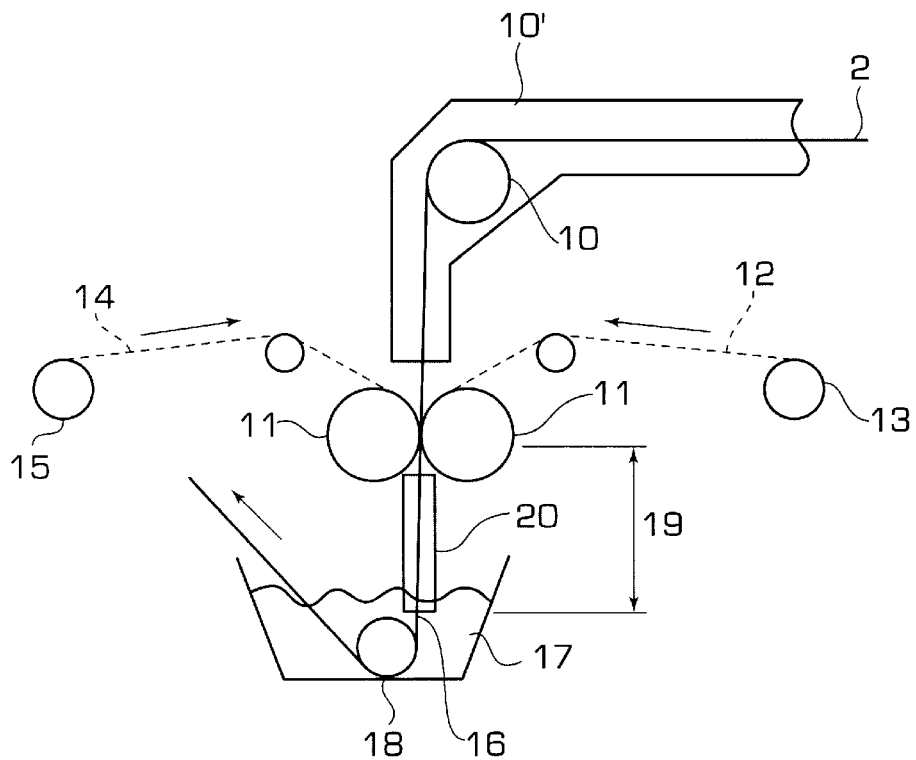
FIG. 4 is a schematic view of an apparatus for producing the laminate metal sheet.

FIG. 4 is a view explaining a method for producing a polyester-metal laminate sheet. A metal sheet 2 is heated by a heating roller 10 in heating zone 10' at a temperature (T1)

in the vicinity of the melting point (Tm) of the polyester, and then fed between laminating rollers 11 and 11. On the other hand, the polyester multilayer film 12 to be arranged on the can outer surface side is unwound from the feeding roller 13 and fed between laminating rollers 11 and 11. The polyester-base film 14 to be arranged on the can inner surface side is unwound from the feeding roller 15 and fed between laminating rollers 11 and 11, presenting a positional relation of sandwitching the metal sheet 2. The laminating rollers 11 and 11 are kept at a temperature (T2) slightly lower than that of the heating roller 10 to heat-bond the polyester films onto both surfaces of the metal sheet 2. At the lower side of laminating rollers 11 and 11, a water tank is provided containing cooling water 17 for quenching the laminate 16 thus formed. A guide roller 18 for guiding the laminate is disposed in the water tank. Between the laminating rollers 11, 11 and the cooling water 16, a gap 19 in a predetermined distance is formed, and a heat-reserving mechanism 20 is provided in the gap 19 to maintain a constant temperature range (T3), to thereby accelerating adhesion.

The heating temperature (T1) of the metal sheet is generally from (Tm−50° C.) to (Tm+100° C.), preferably from (Tm−50° C.) to (Tm+50° C.). The temperature (T2) of the laminating rollers 11 is suitably from (T1−300° C.) to (T1−10° C.), preferably from (T1−250° C.) to (T1−50° C.). It is effective to maintain the temperature of the laminate sheet after passing through the laminating rollers in a heat-reserving zone, and the heat-reserving temperature (T3), based on the temperature T2 of laminating rollers 11, 11 is from (T2+5° C.) to (T2−50° C.), preferably, in the case of a biaxially stretched film, from (the film heat set temperature) to (Tm−5° C.), and in the case of an unstretched film, from (Tg+5° C.) to Tm. The reserving time at the temperature T2 is suitably from 0.1 to 10 seconds, preferably from 0.1 to 3 seconds.

The adhesive primer provided, if desired, between the polyester film and the metal blank provides excellent adhesion to both the metal blank and to the film. Representative examples of the primer coating having excellent adhesion and corrosion resistance include a phenol-epoxy based coating comprising a resol-type phenolaldehyde resin derived from various phenols and formaldehyde, and a bisphenol-type epoxy resin. A coating containing a phenol resin and an epoxy resin in a weight ratio of from 50:50 to 5:95, preferably from 40:60 to 10:90, is particularly preferred.

The adhesive primer layer in general preferably has a thickness of from 0.01 to 10 μm. The adhesive primer layer may be applied to the metal blank or may be applied to the polyester film prior to forming the laminate.

Production of Seamless Can:

The seamless can of the present invention is produced by drawing/deep-drawing the above-described laminate polyester-metal laminate sheet between a punch and a die to form it into a cup having a bottom, and bend-elongating and ironing the cup at the deep-drawing stage to reduce the thickness of the side wall portion of the cup. This draw-ironing imparts an appropriate uniaxial orientation to the film layer on the can barrel. As a result, a polyester laminate film layer having excellent corrosion resistance and excellent adhesion is formed on the side wall portion of the seamless can. Accordingly, it is important to perform the deformation for reducing the thickness by a combination of deformation (bend-elongation) due to a load in the can axis direction (can height direction) and deformation (ironing) due to a load in the can thickness direction, in this order.

Figure 5:
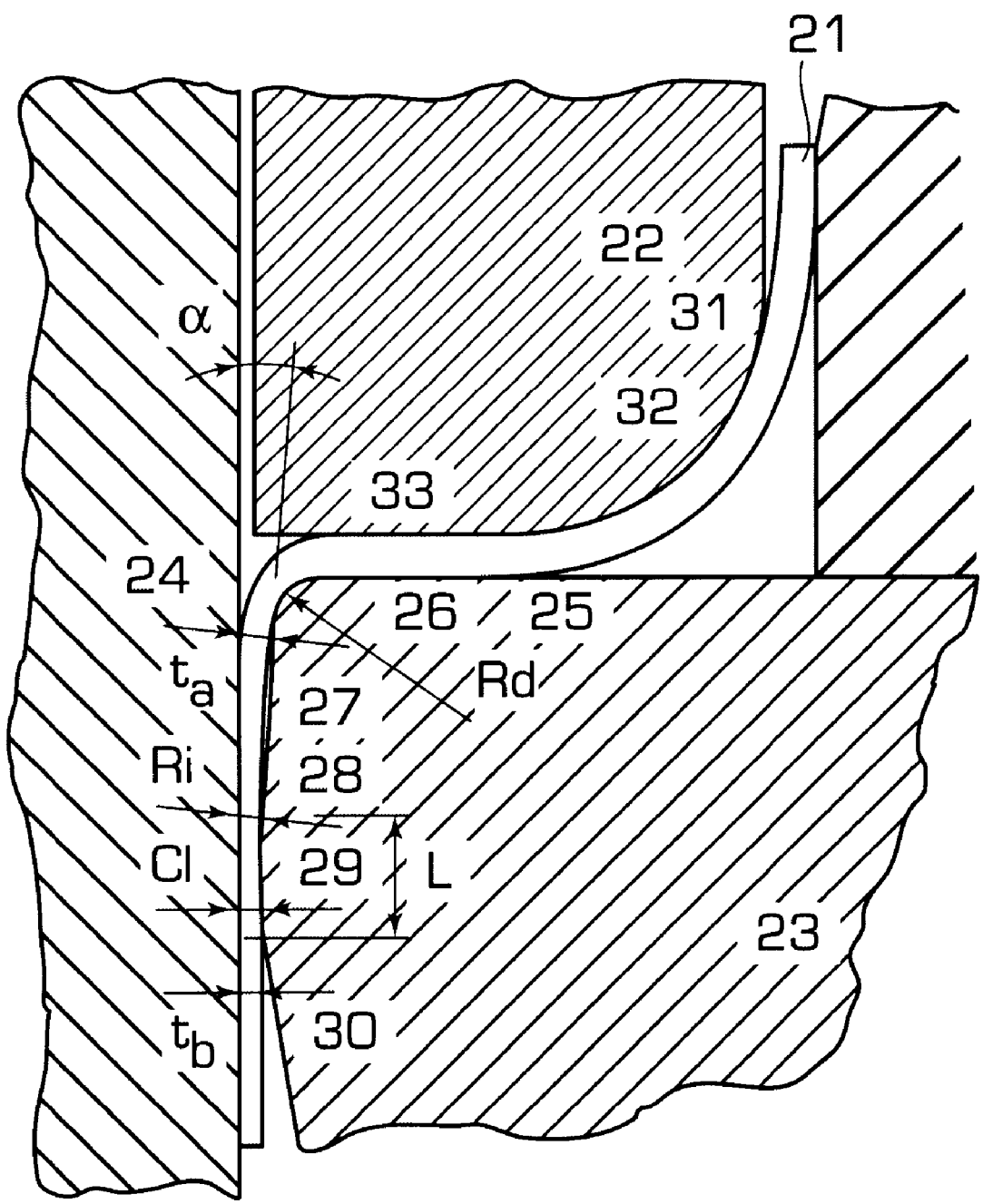
FIG. 5 is a view explaining the draw-ironing formation of the laminate metal sheet.

The draw-ironing formation of the laminate sheet is conducted by the following means. That is, as shown in FIG. 5, a pre-drawn cup 21 formed from a coated metal sheet is held by an annular holding member 22 inserted in the cup and a redraw-ironing die 23 disposed beneath the member. Concentric with the holding member 22 and the redraw-ironing die 23, a redraw-ironing punch 24 is provided removably in or out of the holding member 22. The redraw-ironing punch 24 and the redraw-ironing die 23 are moved relative to each other so as to be in mesh with one another.

The redraw-ironing die 23 has a plane part 25 at the upper portion, a working corner part 26 having a small radius of curvature at the periphery of the plane part, a tapered approach part 27 having a diameter which increases downwardly on the periphery connected to the working corner part, and a cylindrical land part for ironing (ironing part) 29 connected to the approach part through a small curvature part 28. A reverse-tapered recess 30 is provided at the lower part of the land part 29.

The side wall portion of the pre-drawn cup 21 is vertically bent inward of the diameter upon passing through the outer peripheral surface 31 of the annular holding member 22 and the curvature corner part 32 thereof, bent nearly vertically in the axial direction at the working corner part 26 of the redrawing die 23 upon passing through the part defined by an annular bottom surface 33 of the annular holding member 22 and the plane part 25 of the redrawing die 23, and formed into a deep-drawn cup having a size smaller than that of the pre-drawn cup 21. In this case, at the working corner part 26, the portion opposite the side in contact with the corner part 26 is elongated by bending deformation. On the other hand, the portion in contact with the working corner part is elongated by return deformation after leaving the working corner part, to thereby achieve a reduction in the thickness of the side wall portion by bend-elongating.

The outer surface of the side wall portion reduced in thickness by the bend-elongation comes into contact with the approach part 27 having a small taper angle having a diameter which gradually increases. While leaving the inner surface in the free state, the side wall part is guided into the ironing part 29. The travel of the side wall portion passing through the approach part is a pre-stage of the ironing subsequent thereto, where the bent-elongated laminate sheet is stabilized and the size of the side wall portion is slightly contracted to prepare for ironing. More specifically, immediately after bend-elongation, the laminate sheet is in an instable state. That is, the laminate sheet is sensitive to vibration due to the bend-elongation and also the inside of the film is distorted. Accordingly, smooth ironing cannot be achieved if the laminate is immediately subjected to ironing. However, in the present invention, the outer surface side of the side wall portion is placed into contact with the approach part 27 to contract the diameter and lay the inner surface side in the free state. This terminates the influence of vibration and relaxes heterogenous distortion within the film. As a result, smooth ironing can be achieved.

The side wall portion after passing through the approach part 27 is introduced into the clearance between the land part for ironing (ironing part) 29 and the redraw-ironing punch 24, and rolled to a thickness defined by the clearance (C1). The final thickness Cl of the side wall portion is set to be from 10 to 70%, preferably from 10 to 65%, of the original thickness (t) of the laminate. In view of the balance of orientation of the polyester, it is preferred that the bend-elongation accounts for an amount of from 40 to 98%, preferably from 40 to 95% of the reduction in thickness, and the ironing accounts for the remaining, that is, from 2 to 60%, preferably from 5 to 60% of the reduction in thickness. The small curvature part 28 at the introduction side of the ironing part effectively fixes the starting point of ironing to thereby smoothly introduce the laminate into the ironing part 29. The reverse-tapered recess 30 at the lower part of the land part 29 prevents an excessive increase in the working force.

The radius of curvature (Rd) of the curvature corner part 26 in the redraw-ironing die 23 is preferably 2.9 times or less, more preferably 2.5 times or less the thickness (t) of the laminate to provide effective bend-elongation. However, the laminate may be broken if the radius of curvature is too small. Thus, the radius of curvature is preferably 1 times or more, more preferably 1.2 times or more the thickness (t) of the laminate.

The approach angle α (half of the taper angle) of the tapered approach part 27 is preferably from 1 to 8°, more preferably from 1.5 to 5.0°. If the angle of the approach part is less than the above-described range, the relaxation of orientation in the polyester film layer or stabilization before ironing is insufficient, whereas if the angle of the approach part exceeds the above-described range, the bend-elongation is non-uniform (return deformation is insufficient) to cause cracks or peeling of the film.

The radius of curvature (Ri) of the small curvature part 28 is preferably from 0.3 to 20 times the thickness (t) of the laminate to effectively fix the ironing starting point. However, if the radius of curvature is excessively small, the laminate may be broken.

The clearance between the land part 29 for ironing and the redraw-ironing punch 24 is in the range as described above, and the land length L in general is preferably from 0.5 to 3 mm, more preferably from 0.7 to 1.5 mm. If the length exceeds the above-described range, the working force tends to excessively increase, whereas if L is less than the above-described range, the return after ironing work is large and sometimes causes disadvantageous results.

In producing a seamless can, the polyester layer on the surface imparts sufficiently high lubrication performance. However, in order to further increase lubricity, a lubricating agent selected from various fats and oils or waxes may be coated in a small amount. An aqueous coolant (including that used for cooling the work) may be used, but this is not preferred in view of maintaining a simple operation.

The temperature at the time of redraw-ironing work (the can temperature immediately after completion of the production) is preferably from room temperature to the melting point (Tm) of the resin. Accordingly, the tools are preferably heated or cooled as needed.

The container after the drawing formation can subsequently be subjected to heat treatment at least in one stage. The heat treatment is conducted for various purposes and mainly for removing the distortion remaining in the film generated due to working, for evaporating the lubricating agent used at the time of working from the surface, and for dry-hardening the printing ink printed on the surface. The heat treatment may use a known heating apparatus such as an infrared heater, a hot blast circulating furnace or an induction heating apparatus. Furthermore, the heat treatment may be conducted in one stage or in two or more stages. The heat treatment temperature is suitably from 180 to 270° C. The heat treatment time is generally on the order of from 1 second to 10 minutes.

The container after heat treatment may be abruptly cooled or may be left standing to cool. More specifically, in the case of a film or a laminate sheet, an abrupt cooling operation is easy. However, in the case of a container, the abrupt cooling operation on an industrial scale is difficult because the container has a three dimensional shape and a large heat capacity due to the metal. However, in the present invention, even if an abrupt cooling operation is not applied, the crystal growth is suppressed and excellent properties can be achieved in combination. An abrupt cooling means such as cold air blowing or cold water sprinkling may be used, if desired.

The can thus obtained may be subjected, if desired, to one-stage or multi-stage neck-in working and to flange working, and if desired, further to post-working such as panel working of the barrel wall portion, to produce a can for double-seaming.

The present invention is described in greater detail below with reference to the following Examples.

The characteristic values reported herein were determined according to the following measuring methods.

(1) Thickness of Can Barrel Portion to Thickness of Blank

Assuming that the thickness of the blank for the laminate sheet is $t_0$ and the thickness of the can side wall portion after formation is $t_1$, the thickness (%) of the can side wall portion to the thickness of blank is obtained by the formula:

$$t_1/t_0 \times 100$$

(2) Method of Calculating Ironing Ratio

As shown in FIG. 5, assuming that the thickness of the sheet immediately after passing through the working corner part 26 during draw-ironing formation of the laminate sheet, is $t_a$ and the thickness of the sheet immediately after the land part 29 through ironing is $t_b$, the ironing ratio can be obtained by the formula:

$$\text{Ironing Ratio } (\%) = (t_a - t_b)/t_a \times 100$$

(3) Model Kinetic Friction Test

To make a model evaluation of tool abrasion, a kinetic friction test is performed. In this test, a steel ball is contacted with the side to be arranged on the outer surface layer of the laminate sheet. The ball slides in a circle with a diameter of 149.5 mm at a rate of 60 rotations/min, and is shifted about 0.45 mm toward one direction per one rotation to continuously scan a new position of laminate sheet surface. The load W applied to the steel ball is 506.7 g. The kinetic friction resistance $F_k$ (g) is measured when the scanning is performed for 1 minute and 40 seconds. A measurement example of the kinetic friction resistance is shown in FIG. 6. By the model kinetic friction test, the coefficient of kinetic friction, the abrasion amount of the steel ball and shaving of the film surface, described below, are evaluated. The measurement is performed at room temperature.

(3)-a Method of Calculating Coefficient of Kinetic Friction

Assuming that the kinetic friction resistance is $F_k$ (g) and the load applied to the steel ball is W (g), the coefficient of kinetic friction $\mu_k$ is obtained by the following formula:

$$\mu_k = F_k/W$$

(3)-b Method of Calculating Abrasion Amount of Steel Ball

The abrasion trace of the steel ball subjected to the model kinetic friction test is measured, and the abrasion volume of steel ball is approximated.

Assuming that the radius of the steel ball is r and the diameter of the circular abrasion trace appearing on the steel ball face is d (in the case where the abrasion trace is not circular, the value on average is d), the volume is geometrically obtained by the formula:

$$V \approx (\pi/64) \times (d^4/r - d^6/(24 \times r^3))$$

and this is used as the abrasion volume of the steel ball. The steel ball used herein had a radius r=2.5 mm and a Vickers hardness HV=980.

(3)-c Evaluation of Shaving of Film Surface

The surface of the film subjected to the model kinetic friction test is observed through a microscope, and the state of shaved film is evaluated as ○, Δ or x. The degree of shaving is evaluated according to the following criteria:

○: shaving of small or medium degree (no cracks in the film);
Δ: large shaving or generation of cracks in the film;
x: film is broken.

The practical range is ○.

(4) Measurement of Can Production Temperature

The temperature of the can immediately after the draw-ironing formation is measured by a Thermovision 870 manufactured by AGEMA, and the temperature thus measured is used as the temperature of the can thus produced.

(5) Storage Test

The can is stored at a relative humidity of 80% and a temperature of 37° C., and the state of the can after 3 months is examined.

EXAMPLE 1

A biaxially stretched, isophthalic acid copolymer polyethylene terephthalate laminate film having a thickness of 25 μm and a melting point of 225° C., shown in Table 1, was heat-laminated on one surface (to be arranged on the outer face of the container) of a TFS (tin-free steel sheet treated with electrolytic chromic acid) having a blank thickness of 0.18 mm and a tempering degree of DR6, and a biaxially stretched isophthalic acid copolymer polyethylene terephthalate film having a thickness of 25 μm and a melting point of 225° C. was heat-laminated on the other surface (to be arranged on the inner face of the container), each at a sheet temperature of 235° C., a laminating roller temperature of 160° C. and a sheet travelling rate of 20 m/min. The resulting laminate was immediately cooled with water to obtain a laminate metal sheet. A wax-base lubricant was applied to both surfaces of the laminate metal sheet, and the metal sheet was punched into a circular blank having a diameter of 166 mm to obtain a shallow-drawn cup.

The thus-obtained shallow-drawn cup was redrawn and ironed to obtain a deep-drawn and ironed cup. The deep-drawn cup thus obtained had the following properties:

| | |
|---|---|
| Cup size | 60 mm |
| Cup height | 128 mm |
| Thickness of can side wall portion to blank thickness | 65% |
| Ironing ratio | 12% |

The resulting deep-drawn and ironed cup was domed in a customary manner, and then heat treated at 215° C. After being left to cool, the cup was trimmed, printed on the outer curved surface thereof, dried to complete the printing step, necked and flanged to obtain a 350 g-volume seamless can.

100,000 cans were continuously produced and the results thereof are shown in Table 1. The can-making state was stable and appearance failure such as shaving of the film on the can outer face was not observed.

The can temperature immediately after deep-drawing and ironing formation was measured by the Thermovision and found to be 95° C.

Separately, the surface of the laminate sheet to be arranged on the outer surface of the container was subjected to a model kinetic friction test as described above. As a result, shaving of small to medium degree was observed, but no cracks were formed in the film. The evaluation result was good, and the sheet was evaluated as falling within the practical use range.

EXAMPLE 2

A 350 g-volume seamless can was obtained in the same manner as in Example 1, except for using the biaxially stretched isophthalic acid copolymer polyethylene terephthalate laminate film as shown in the row of Example 2 in Table 1, on the surface to be arranged on the outer face.

100,000 cans were continuously produced and the results thereof are shown in Table 1. The can-making state was stable, and appearance failure such as the shaving of film on the can outer face was not observed.

The can temperature immediately after deep-drawing and ironing formation was 90° C.

Separately, the surface of the laminate sheet to be arranged on the outer face of the container was subjected to a model kinetic friction test as described above. As a result, the degree of shaving was small. The evaluation result was good, and the sheet was evaluated as falling within the practical use range.

EXAMPLE 3

A 350 g-volume seamless can was obtained in the same manner as in Example 1, except for using the biaxially stretched isophthalic acid copolymer polyethylene terephthalate laminate film as shown in the row of Example 3 in Table 1, on the surface to be arranged on the outer face, and changing the sheet temperature to 240° C.

100,000 cans were continuously produced and the results thereof are shown in Table 1. The can-making state was stable, and appearance failure such as shaving of film on the can outer face was not observed.

The can temperature immediately after deep-drawing and ironing formation was 90° C.

Separately, the surface of the laminate sheet to be arranged on the outer face of the container was subjected to a model kinetic friction test as described above. As a result, the degree of shaving was small, the evaluation result was good, and the sheet was evaluated as falling within the practical use range.

EXAMPLE 4

A laminate sheet was obtained in the same manner as in Example 1, except that the blank thickness was 0.280 mm, the biaxially stretched isophthalic acid copolymer laminate film, shown in the row of Example 4 in Table 1, was used on the surface to be arranged on the outer face, a biaxially stretched isophthalic acid copolymer film containing 30 wt % of polybutylene terephthalate having a melting point of 235° C. was used on the surface to be arranged on the inner face, and the sheet temperature and the laminating roller temperature were changed to 245° C. and 120° C., respectively. The resulting laminate sheet was punched into a circular sheet having a diameter of 162 mm to obtain a shallow-drawn cup. The thus-obtained shallow-drawn cup was redrawn and ironed to obtain a cup. The deep-drawn cup thus obtained had the following properties:

| | |
|---|---|
| Cup size | 52 mm |
| Cup height | 135 mm |
| Thickness of can side wall portion to blank thickness | 75% |
| Ironing ratio | 10% |

Afterwards, the cup was worked in the same manner as in Example 1 to obtain a 250 g-volume seamless can.

100,000 cans were continuously produced and the results thereof are shown in Table 1. The can-making state was stable, and appearance failure such as shaving of the film on the can outer face was not observed.

The can temperature immediately after deep-drawing and ironing formation was 110° C.

Separately, the surface of the laminate sheet to be arranged on the outer face of the container was subjected to a model kinetic friction test as described above. As a result, shaving of small to medium degree was generated, but the evaluation result was good and the sheet was evaluated as falling within the practical use range.

EXAMPLE 5

A laminate sheet was obtained in the same manner as in Example 1, except that the blank thickness was 0.240 mm, a biaxially stretched polyethylene naphthalate polyethylene terephthalate copolymer laminate film, as shown in the row of Example 5 in Table 1, was used on the surface to be arranged on the outer face, a biaxially stretched polyethylene naphthalate-polyethylene terephthalate copolymer film having a melting point of 250° C. was used on the surface to be arranged on the inner face, and the sheet temperature and the laminating roller temperature were changed to 280° C. and 160° C., respectively. The resulting laminate sheet was punched into a circular sheet having a diameter of 143 mm to obtain a shallow-drawn cup. The thus-obtained shallow-drawn cup was redrawn and ironed to obtain a cup. The deep-drawn cup thus obtained had the following properties:

| | |
|---|---|
| Cup size | 52 mm |
| Cup height | 112 mm |
| Thickness of can side wall portion to blank thickness | 73% |
| Iron ratio | 13% |

This deep-drawn can was worked in the same manner as in Example 1, except for applying doming for negative pressure cans and changing the heat treatment temperature after doming to 245° C. to obtain a 200 g-volume seamless can.

100,000 cans were continuously produced and the results thereof are shown in Table 1. The can-making state was stable, and appearance failure such as shaving of the film on the can outer face was not observed.

The can temperature immediately after deep-drawing and ironing formation was 125° C.

Separately, the surface of the laminate sheet to be arranged on the outer face of the container was subjected to a model kinetic friction test as described above. As a result, the degree of shaving was small, the evaluation result was good, and the sheet was evaluated as falling within the practical use range.

EXAMPLE 6

A 350 g-volume seamless can was obtained in the same manner as in Example 1, except that the laminate sheet was obtained by co-extrusion coating of the isophthalic acid copolymer polyethylene terephthalate laminate resin structure shown in the row of Example 6 in Table 1, and an isophthalic acid copolymer polyethylene terephthalate resin having a thickness of 30 μm and a melting point of 225° C. on the surfaces to be arranged on the outer face and the inner face, respectively.

100,000 cans were continuously produced and the results thereof are shown in Table 1. The can-making state was stable, and appearance failure such as shaving of film on the can outer face was not observed.

The can temperature immediately after deep-drawing and ironing formation was 95° C.

Separately, the surface of the laminate sheet to be arranged on the outer face of the container was subjected to a model kinetic friction test as described above. As a result, shaving of small to medium degree was generated but no cracks were formed in the film. The evaluation result was good, and the sheet was evaluated as falling within the practical use range.

EXAMPLE 7

A 350 g-volume seamless can was obtained in the same manner as in Example 1, except for using the biaxially stretched isophthalic acid copolymer polyethylene terephthalate laminate film shown in the row of Example 7 in Table 1, on the surface to be arranged on the outer face.

From the time when about 90,000 cans were continuously produced, shaving of the film on the can outer face occurred very often and stable can-making could not be achieved. The appearance of the cans was determined not to be suitable for practical use. Also, flaws were generated on the surface of the ironing ring.

The can temperature immediately after the deep-drawing and ironing formation was 90° C.

Separately, the surface of the laminate sheet to be arranged on the outer face of the container was subjected to a model kinetic friction test as described above. As a result, the film was shaved to a great extent, and cracks or raptures were formed in the film. Accordingly, the sheet was evaluated as not being suitable for practical use.

EXAMPLE 8

A 350 g-volume seamless can was obtained in the same manner as in Example 1, except for using the biaxially stretched isophthalic acid copolymer polyethylene terephthalate laminate film shown in the row of Example 8 in Table 1, on the surface to be arranged on the outer face.

From the time when about 90,000 cans were continuously produced, shaving of the film on the can outer face occurred very often and stable can-making could not be achieved. The appearance of the cans was determined not to be suitable for practical use. Flaws were generated on the surface of the ironing ring.

The can temperature immediately after the deep-drawing and ironing formation was 80° C.

Separately, the surface of the laminate sheet to be arranged on the outer face of the container was subjected to a model kinetic friction test as described above. As a result, the film was shaved to a great extent, and cracks or raptures were formed in the film. Accordingly, the sheet was evaluated as not being suitable for practical use.

EXAMPLE 9

A 250 g-volume seamless can was obtained in the same manner as in Example 4, except for using the biaxially stretched isophthalic acid copolymer polyethylene terephthalate laminate film shown in the row of Example 9 in Table 1, on the surface to be arranged on the outer face, and changing the ironing ratio to 1%. The can temperature immediately after the deep-drawing and ironing was 160° C.

From the time when about 50,000 cans were continuously produced, shaving of the film on the can outer face occurred very often and stable can-making could not be achieved. The appearance of cans was determined not to be suitable for practical use. Flaws were generated on the surface of the ironing ring. Furthermore, the film was melted during the print baking process and the print quality was deteriorated.

EXAMPLE 10

A 250 g-volume seamless can was produced in the same manner as in Example 4, except for using the biaxially stretched isophthalic acid copolymer polyethylene terephthalate laminate film shown in the row of Example 10 in Table 1, on the surface to be arranged on the outer face, and applying heat to control the tool temperature so that the can temperature immediately after formation was 270° C.

Immediately after the start of can-making, the film was melt-welded into the tools and cans could not be produced continuously.

EXAMPLE 11

A 200 g-volume seamless can was produced in the same manner as in Example 5, except for using the biaxially stretched polyethylene naphthalate polyethylene terephthalate copolymer laminate film shown in the row of Example 11 in Table 1, on the surface to be arranged on the outer face, and controlling the tool temperature by cooling so that the can temperature immediately after formation was 10° C.

Immediately after the start of can-making, the can barrel was broken or delamination occurred, and therefore, continuous can-making could not be performed.

EXAMPLE 12

A 350 g-volume seamless can was obtained in the same manner as in Example 1, except for using the biaxially stretched isophthalic acid copolymer polyethylene terephthalate laminate film shown in the row of Example 12 in Table 1, on the surface to be arranged on the outer face.

Delamination was caused on the flange head part of the can thus produced. After aging at a relative humidity of 80% and a temperature of 37° C. for 3 months, under-film corrosion was observed over the area from the neck part to the double-seam part, and the can was determined not to be suitable for practical use.

TABLE 1

Film Construction and Evaluation Results

| Example | Titanium Oxide Content (wt %) | | | Thickness ($\mu$m) | | | Melting Point Tm (° C.) | | | Temperature of Can Produced (° C.) | Continous Can-Making Test | Evaluation of Shaving of Film | Storage Test |
|---|---|---|---|---|---|---|---|---|---|---|---|---|---|
| | Intermediate Layer (A) | Surface Layer (B) | Backing alyer (C) | (A) | (B) | (C) | (A) | (B) | (C) | | | | |
| 1 | 40 | 15 | 15 | 20 | 1.5 | 1.5 | 225 | 225 | 225 | 95 | no problem | o | no abnormality |
| 2 | 30 | 0 | 0 | 20 | 0.5 | 0.5 | 225 | 225 | 225 | 90 | no problem | o | no abnormality |
| 3 | 25 | 5 | 0 | 40 | 2 | 0.5 | 225 | 225 | 225 | 90 | no problem | o | no abnormality |
| 4 | 50 | 10 | 10 | 10 | 0.5 | 0.5 | 235 | 240 | 235 | 110 | no problem | o | no abnormality |
| 5 | 50 | 0 | 0 | 20 | 1 | 1 | 250 | 250 | 250 | 105 | no problem | o | no abnormality |
| 6 | 40 | 15 | 15 | 20 | 1.5 | 1.5 | 225 | 225 | 225 | 95 | no problem | o | no abnormality |
| 7 | | 25 | | | 25 | | | 225 | | 90 | frequent shaving of film, flaws on the tool | x | under-film corrosion |
| 8 | 25 | 22 | 22 | 22 | 1 | 1 | 225 | 225 | 225 | 80 | frequent shaving of film, flaws on the tool | x | not tested |
| 9 | | 25 | | | 70 | | | 170 | | 160 | frequent shaving of film, few flaws on the tool | x | not tested |
| 10 | 25 | 22 | 22 | 20 | 1.5 | 1.5 | 235 | 240 | 235 | 270 | continuous can-making impossible | not evaluated | not tested |
| 11 | | 25 | | | 12 | | | 250 | | 10 | continuous can-making impossible | not evaluated | not tested |
| 12 | 35 | 5 | 35 | 5 | 15 | 5 | 225 | 225 | 225 | 120 | delamination occurred | o | under-film corrosion |

According to the present invention, a laminate sheet is provided comprising a metal sheet and a thermoplastic resin layer provided on the surface of the metal sheet. The thermoplastic resin layer comprises a laminate film layer comprising a polyester-base resin intermediate layer (A) containing 10 wt % or more of coloring agent particles, a polyester-base resin outer surface layer (B) and a polyester-base resin backing layer (C). The outer surface layer (B) and the backing layer (C) each contains said coloring agent particles in an amount of 20 wt % or less and in an amount less than that contained in said intermediate layer (A). The laminate sheet is subjected to draw-ironing formation. In making cans, tool abrasion and particularly abrasion of the ironing ring reduced, film shaving is prevented, and a coated seamless can having an excellent hiding property, adhesion and corrosion resistance is efficiently produced.

While the invention has been described in detail and with reference to specific embodiments thereof, it will be apparent to one skilled in the art that various changes and modifications can be made therein without departing from the spirit and scope thereof.

What is claimed is:

1. A laminate sheet for can-making, comprising a metal sheet and a thermoplastic resin layer provided on the surface of the metal sheet, wherein said thermoplastic resin layer comprises a laminate film layer comprising a polyester resin intermediate layer (A) containing coloring agent particles in an amount of 10 wt % or more, a polyester resin outer surface layer (B) and a polyester resin backing layer (C), the outer surface layer (B) and the backing layer (C) each containing said coloring agent particles in an amount of 20 wt % or less and in an amount less than that contained in said intermediate layer (A).

2. The laminate sheet as claimed in claim 1, wherein the intermediate layer (A) contains coloring agent particles in an amount of from 10 to 70 wt %, and the outer surface layer (B) and the backing layer (C) each contains coloring agent particles in an amount of from 0 to 18 wt %.

3. The laminate sheet as claimed in claim 1, wherein the coloring agent particles comprise titanium dioxide.

4. The laminate sheet as claimed in claim 1, wherein the thickness ratio of said intermediate layer (A) to said outer surface layer (B) or backing layer (C) is from 2:1 to 100:1.

5. The laminate sheet as claimed in claim 1, wherein the laminate film has a thickness of from 2 to 50 $\mu$m.

6. The laminate sheet as claimed in claim 1, wherein said polyester resin is a polyester comprising at least one ester unit selected from the group consisting of ethylene terephthalate, ethylene isophthalate, butylene terephthalate, butylene isophthalate and ethylene naphthalate.

7. The laminate sheet as claimed in claim 1, wherein the polyester resin of the outer surface layer (B) has a melting point of from 180 to 270° C.

8. The laminate sheet as claimed in claim 1, where the laminate film layer consists of said intermediate layer (A), said outer surface layer (b) and said backing layer (C).

* * * * *